United States Patent
Challener et al.

(10) Patent No.: US 6,546,499 B1
(45) Date of Patent: Apr. 8, 2003

(54) REDUNDANT ARRAY OF INEXPENSIVE PLATTERS (RAIP)

(75) Inventors: David Carroll Challener, Raleigh, NC (US); Andrew Boyce McNeill, Jr., Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/418,282

(22) Filed: Oct. 14, 1999

(51) Int. Cl.$^7$ ................................................ G06F 11/00
(52) U.S. Cl. ........................................................ 714/6
(58) Field of Search ............................... 714/6; 711/114

(56) References Cited

U.S. PATENT DOCUMENTS

| | | | |
|---|---|---|---|
| 4,811,124 A | | 3/1989 | Dujari et al. |
| 5,408,644 A | | 4/1995 | Schneider et al. |
| 5,477,518 A | | 12/1995 | Hiatt |
| 5,487,931 A | * | 1/1996 | Annacone et al. .......... 360/135 |
| 5,537,534 A | | 7/1996 | Voigt et al. |
| 5,542,065 A | | 7/1996 | Burkes et al. |
| 5,613,085 A | | 3/1997 | Lee et al. |
| 5,739,996 A | | 4/1998 | Bennett et al. |
| 6,215,629 B1 | * | 4/2001 | Kant et al. ................... 360/290 |
| 6,408,400 B2 | * | 6/2002 | Taketa et al. ................. 714/49 |

FOREIGN PATENT DOCUMENTS

JP      62047881 A   *   3/1987   ........... G11B/21/02

OTHER PUBLICATIONS

Chen et al. "RAID: High–Performance, Reliable Secondary Storage". ACM Computing Surveys, vol. 26, No. 2, Jun. 1994, pp. 145–185.*

Chuck Musciano. "0,1,0+1... RAID bacic, Part 1." Sunworld. Jun. 1999. http://sunsite.uakom. sk/sunworldonline/swol–0601999/swol–06–raid1.html.*

Chuck Musciano. "RAID basics, Part 2: Moving on to RAID 3 and RAID 5." Sunworld. Jul. 1999. http://sunsite.uakom.sk/sunworldonline/swol–07–raid2.html.*

* cited by examiner

Primary Examiner—Robert Beausoliel
Assistant Examiner—Yolanda L. Wilson
(74) Attorney, Agent, or Firm—Bracewell & Patterson, LLP

(57) ABSTRACT

Redundant Array of Inexpensive Platters (RAIP) uses data management and storage techniques and concepts from Redundant Array of Independent Disks (RAID) technology. These techniques and concepts that are used with multiple disks are incorporated into being used within a single disk drive. RAIP is used within a single disk drive having at least one platter and multiple heads. The at least one platter is utilized in the same or similar manner as at least one of the multiple disks in a redundant array of independent disks (RAID). RAIP is generally implemented by using each side of a platter of the single disk drive in the same or similar manner as each disk drive of multiple disk drives. A system and method of providing and implementing RAIP within a single disk drive is disclosed. The single disk drive is provided with at least one platter, a number of stripes located in the at least one platter for dividing storage within the at least one platter, and a number of heads communicatively coupled to the at least one platter for writing and reading data thereat. The data is stored in the at least one platter in a redundant array level, and the stripes in the at least one platter are used to provide and store the data in the redundant array level. The redundant array level may be any of various RAIP levels.

18 Claims, 4 Drawing Sheets

(Stripe 3, Parity 4-6, Stripes 8,11,...)

(Parity 1-3, Stripes 6,9,12,...)

REDUNDANT ARRAY OF INEXPENSIVE PLATTERS (RAIP)

BACKGROUND OF THE INVENTION

1. Technical Field

The present invention relates in general to using data management and storage techniques and concepts from Redundant Array of Independent Disks (RAID) technology and incorporating these techniques and concepts into a single disk drive and in particular to providing and using a redundant array of inexpensive platters (RAIP) within a single disk drive.

2. Description of the Related Art

Redundant Array of Independent Disks (RAID) technology has been developed to provide a reliable foundation for computation by computer systems or servers. RAID allows the combining of two or more disk drives to create an array of disk drives. Hardware or software implementation allows the multiple disk drives to be treated as one logical disk drive. Data is stored redundantly in various ways to enhance data integrity and availability. RAID sub-systems provide cost-effective solutions for storage strategies. RAID systems are also able to provide improved data transfer rates and throughput of data.

RAID technology provides several different ways to use multiple disk drives to increase availability and performance. A number of RAID specifications or levels have been defined wherein each specification or level provides unique capabilities in areas of throughput and fault tolerance. Several RAID levels provide fault tolerance such that if one of the multiple disk drives fails, then access to all data stored on the array is still available. The failed disk drive is able to be replaced or repaired while the array is still usable and accessible.

Various specifications or levels of RAID have been defined and are well known in the art. These RAID levels are incorporated by reference herein. Some of the RAID levels are briefly described below:

"RAID 0" uses the concept of drive spanning. Drive spanning allows multiple disk drives to be logically and serially linked into a single logical disk drive. RAID 0 uses "data striping" in which data is evenly distributed across the physical drives in such a manner as to maximize input or output performance. Data striping divides the logical drive into data blocks called stripes, which are distributed over the disk drives. The layout is such that a sequential read of data on the logical drive results in parallel reads to the disk drives. RAID 0 provides a large logical disk drive through drive spanning and provides performance acceleration through data striping. However, RAID 0 does not provide redundancy.

"RAID 1" uses the concept of data mirroring wherein a single logical disk drive is created from two physical disk drives. All data written to the logical drive is written identically to the two disk drives. Thus, a pair of drives with identical data is created. In the event of failure of one of the physical drives, the same data is still accessible from the other physical drive by using a hot-spare drive to reestablish the mirror relationship and redundancy while the failed drive is being replaced or repaired. RAID 1 provides the following advantages: 1) Redundancy through mirrored copy of data; 2) The read performance is superior to RAID 0 and RAID 5 (RAID 5 will be briefly described later in this description); and 3) The write performance and the critical-mode performance are superior to RAID 5. However, RAID 1 provides the following disadvantages: 1) Write performance is worse than RAID 0; 2) The required capacity overhead is higher than in RAID 5; and 3) An even number of physical disk drives is required. RAID 1 is most particularly useful when performance is more important than capacity and when the drive configuration is limited to two disk drives.

"RAID 1 Enhanced" (also known as RAID 1E, Hybrid RAID 1, or RAID 6) combines the concepts of data mirroring with data striping. Data is striped across each disk drive in the array. The first set of stripes is the data stripes while the second set of stripes is the mirror stripes (copies) of the first data stripes that are shifted one disk drive. RAID 1 Enhanced shares the same characteristics of RAID 1 but additionally allows more than two disk drives as part of the disk array and also allows an odd number of disk drives as part of the disk array.

"RAID 10" (also known as RAID 1+0) combines data mirroring with data striping. RAID 10 provides mirroring of two RAID 0 systems.

"RAID 3" stripes data one group of bits or bytes at a time across all the disk drives. Parity information is used to reconstruct missing data and is stored on a separate dedicated drive. A RAID 3 configuration requires at least one parity disk drive and at least two other disk drives. RAID 3 also requires all of the disk drives to be rotationally synchronized. RAID 3 provides the following advantages: 1) Reduction of amount of additional disk space required for redundancy since a parity disk is used; 2) Performance is enhanced in very large block transfers; and 3) Data protection is excellent since, in the event of a drive failure, data is still able to be accessed and reconstructed by using the information from the other disks and the parity disk. RAID 3, however, provides the following disadvantages: 1) Performance bottleneck may exist during write operations since only a single parity disk drive is provided and 2) RAID 3 is obsolete in the sense that it is not able to be used in current SCSI and Fibre Channel drives.

"RAID 4" is similar to RAID 3 except that it utilizes larger stripes to improve the write performance of the array. RAID 4 is an older version of RAID 3. The use of parity in RAID 4 greatly reduces the amount of additional disk space required for redundancy, but the single parity disk drive may result in performance bottleneck during write operations.

"RAID 5" utilizes the concepts of data striping and block interleaving. The technique provides fault-tolerant data storage and does not require duplicate disk drives such as in RAID 1. RAID 5 spreads the data and parity information across the disks one block at a time. This spreading of information provides maximum read performance when accessing large files and improves array performance in a transaction processing environment. Redundancy is provided by parity information being striped across the drives. The striping of parity information removes the bottleneck that results from storing all of the parity data onto one drive. RAID 5 requires a minimum of three disk drives. The parity data is stored in a storage capacity equivalent to one drive per entire array. Performance in RAID 5 is generally superior than in RAIDS 3 and 4. However, performance boost is somewhat limited to smaller block transfers, such as the size of typical network or Internet files. RAID 5 provides excellent protection in that if any of the disk drives fails, the data is still able to be accessed by using the information from the other disk drives and the striped parity information. RAID 5 provides the following advantages: 1) Redundancy is provided by using parity; 2) the least or minimal amount of storage capacity overhead is used in the number of drives; and 3) The minimal amount of additional disk drives necessary to implement redundancy is used. RAID 5, however, provides the following disadvantages: 1) The write performance is much worse than in RAID 0 and worse than in RAID 1; 2) The read performance is equal to RAID 0 but worse than in RAID 1; and 3) The critical-performance, (i.e. performance when one disk has failed) is the worst among all of the RAID levels.

It is well known in the art that some disk drives each have a single magnetic recording platter with one or more magnetic read/write heads which are used to write and read magnetic data patterns on one or both sides of the platter, and that some disk drives each have multiple platters with multiple heads. The RAID technology provides excellent solutions for storage and high performance access of data. However, the use of multiple disk drives, at times and instances, may be cost prohibitive, expensive, and infeasible in implementing the RAID methodology for deriving the advantages therefrom for desired applications and purposes. Thus, it would be highly desired at these times and instances to incorporate the RAID concepts and techniques into a single disk drive, particularly for providing the cost advantages of using less disk drives.

It would therefore be advantageous and desirable to use data management and storage techniques and concepts from Redundant Array of Independent Disks (RAID) technology and incorporating these techniques and concepts into a single disk drive. It would also be advantageous and desirable to provide using a redundant array of inexpensive platters (RAIP) within a single disk drive wherein RAIP provides cost advantages over RAID. It would still also be advantageous and desirable to provide and utilize RAIP within a single disk drive that has a single platter and multiple heads that allow writing data to and reading data from both sides of the single platter. It would still further be advantageous and desirable to provide and utilize RAIP within a single disk drive that has multiple platters and multiple heads.

SUMMARY OF THE INVENTION

It is therefore one object of the present invention to use data management and storage techniques and concepts from Redundant Array of Independent Disks (RAID) technology and incorporating these techniques and concepts into a single disk drive.

It is another object of the present invention to provide using a redundant array of inexpensive platters (RAIP) within a single disk drive wherein RAIP provides cost advantages over RAID.

It is a further object of the present invention to provide and utilize RAIP within a single disk drive that has a single platter and multiple heads.

It is still a further object of the present invention to provide and utilize RAIP within a single disk drive that has multiple platters and multiple heads.

The foregoing objects are achieved as is now described. Redundant Array of Inexpensive Platters (RAIP) uses data management and storage techniques and concepts from Redundant Array of Independent Disks (RAID) technology. These techniques and concepts that are used with multiple disks are incorporated into being used within a single disk drive. RAIP is used within a single disk drive having at least one platter and multiple heads. The at least one platter is utilized in the same or similar manner as-at least one of the multiple disks in a redundant array of independent disks (RAID). RAIP is generally implemented by using each side of a platter of the single disk drive in the same or similar manner as each disk drive of multiple disk drives. A system and method of providing and implementing RAIP within a single disk drive is disclosed. The single disk drive is provided with at least one platter, a number of stripes located in the at least one platter for dividing storage within the at least one platter, and a number of heads communicatively coupled to the at least one platter for writing and reading data thereat. The data is stored in the at least one platter in a redundant array level, and the stripes in the at least one platter are used to provide and store the data in the redundant array level. The redundant array level may be any of various RAIP levels.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention uses data management and storage techniques and concepts from Redundant Array of Independent Disks (RAID) technology. These techniques and concepts that are used with multiple disks are incorporated into being used within a single disk drive. Thus, the present invention provides a redundant array of inexpensive platters (RAIP). RAIP is used within a single disk drive having at least one platter and multiple heads. The at least one platter is utilized in the same or similar manner as at least one of the multiple disks in a redundant array of independent disks (RAID). RAIP provides cost advantages over RAID since RAIP only uses a single disk drive while RAID generally uses multiple disk drives. Thus, the present invention RAIP is generally implemented by using each platter of the single disk drive in the same or similar manner as each disk drive of multiple disk drives. In other words, RAIP and RAID parallel each other in that each platter in RAIP generally operates in the same or similar manner as each disk drive in RAID.

The present invention is not in any way limited to any particular/specific implementation, configuration, hardware, or technique. In particular, the present invention is not in any way limited to the implementations, configurations, hardware systems, or techniques disclosed in this specification. Various implementations, configurations, and examples of RAIP Levels exist. The specification provides two hardware configurations for implementation of RAIP and three examples of various RAIP Levels, particularly RAIP Level 1, RAIP Level 3, and RAIP Level 5.

Figure 1:
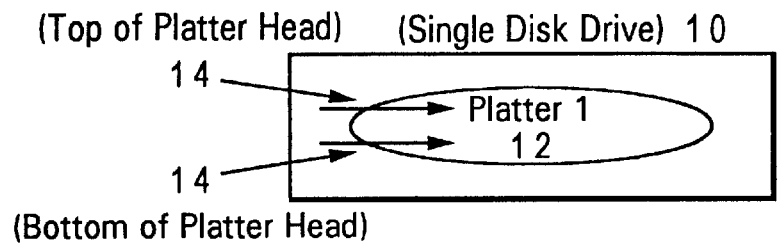
FIG. 1 is a front perspective view of a single disk drive with a single platter and multiple heads that is used to implement the present invention RAIP, which is RAID techniques and concepts incorporated into and within a single disk drive.

The present description refers to various disk drives. As shown in the figures, each disk drive has one or more platters 12. As further shown in the figures, it is well known that a head 14 is generally located at the top of each platter and another head 14 is generally located at the bottom of each platter (see FIG. 1 for a specific example). With reference now to the figures and in particular with reference to FIG. 1, a single disk drive 10 with a single platter 12 (Platter 1) and multiple heads 14 for reading the platter 12 is shown. The disk drive 10 of FIG. 1 is used to implement the present invention RAIP, which is RAID techniques and concepts incorporated into and within the single disk drive 10 shown in FIG. 1. In particular, the present specification discloses that RAIP Level 1 is implemented in the single disk drive 10 of FIG. 1 (i.e. disk drive 10A). However, the single disk drive 10 of FIG. 1 is not in any way limited to being able to implement any specific RAIP Level disclosed in this specification, and any suitable RAIP Level may be implemented within the single disk drive 10 of FIG. 1.

Figure 2:
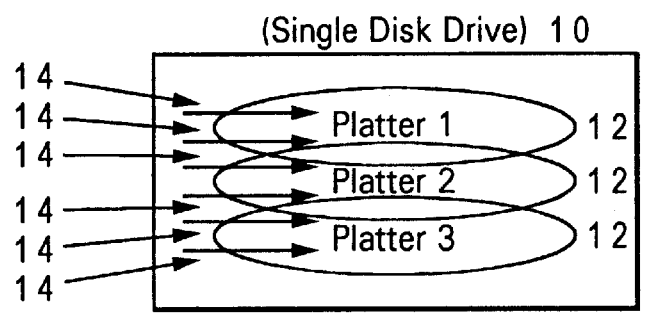
FIG. 2 is a front perspective view of a single disk drive with multiple platters and multiple heads that is used to implement the present invention RAIP, which is RAID techniques and concepts incorporated into and within a single disk drive.

With reference now to the figures and in particular with reference to FIG. 2, a single disk drive 10 with a multiple platters 12 (Platters 1, 2, and 3) and multiple heads 14 for reading the platters 12 is shown. The disk drive 10 of FIG. 2 is used to implement the present invention RAIP, which is RAID techniques and concepts incorporated into and within the single disk drive 10 shown in FIG. 2. In particular, the present specification discloses that RAIP Levels 3 and 5 are each implemented in a single disk drive 10 of FIG. 2 (i.e. respectively disk drives 10B and 10C). However, the single disk drive 10 of FIG. 2 is not in any way limited to being able to implement any specific RAIP Level disclosed in this specification, and any suitable RAIP Level may be implemented within the single disk drive 10 of FIG. 2.

One of the features for implementation of the present single disk drive 10 is that the platters 12 are mechanically linked and that the heads 14 are also mechanically linked so that the platters 12 are able to read in parallel to allow the creation and implementation of the present invention RAIP. This configuration of the platters 12 and heads 14 allow for an increased speed in reading the data from the platters 12. The configuration would also allow for some increased reliability of data as parity bits are able to be assigned and recovery from a crash of a head 14 may be easier. Generally, the mechanical link configuration is the same or similar as to how head(s) 14 are presently linked within a disk drive 10.

Since disk drive motors are the single most important likely failure point, the large increase in reading rate is able to allow the spindle speed to be decreased, thereby increasing the reliability of the motor and decreasing the cost of the motor as well. One of the mechanically linked heads 14 is able to read a sector on a disk drive 10 and the other heads 14 are able to automatically read the appropriate sectors on the disk drive 10 by preventing or minimizing the movements of the heads 14 in relationship to one another due to thermal expansion. These movements due to thermal expansion are prevented by using invar, which is a metal alloy that is invariant under temperature changes to changes in length, as the material for constructing and making the supporting material for the heads 14. Also, the heads 14 may have micro-adjusters mounted on them for adjusting and controlling the position of the heads on the respective sectors and/or relative to the at least one platter of the single disk drive. Alternatively, the disk drive 10 may be constructed to not have or minimize large temperature fluctuations by providing a fair amount of wind (i.e. cooling fan) or by designing thermal conduction paths designed therein (i.e. such as coating the disk platters with diamond, which is an excellent thermal conductor). The head design would utilize the uniform material so that the heads 14 move uniformly. Since the head material is metal and the temperature across the head structure is relatively uniform so that the heads 14 will be in the same relative position, the adjustment of one head 14 in position on its platter 12 will automatically position the other heads 14 over the correct positions on their platters 12. Thus, the present invention RAIP within a single disk drive 10 provides the general advantages of reliability (i.e. in that motors do not have to be run at their maximum rating), speed (i.e. data is read in parallel), and cost (i.e. use less expensive motors).

Furthermore, the present invention RAIP is used in applications where random seeks do not predominate and primarily where data streaming is the major element of reading or writing. Some examples of such applications would be duplication services, video, and random numbers. However, the present invention is not in any way limited to these examples.

Figure 3:
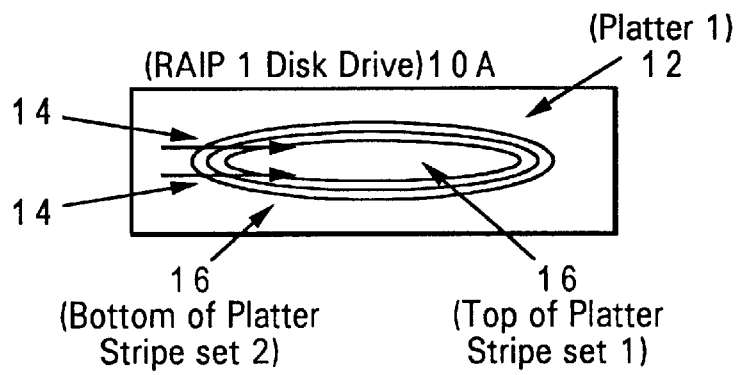
FIG. 3 is a front perspective view of a single disk drive with a single platter and multiple heads that is used to implement and show a RAIP Level 1 embodiment, which is RAID Level 1 concepts and techniques incorporated into and within a single disk drive.

With reference now to the figures and in particular with reference to FIG. 3, a single disk drive 10A with a single platter 12 and multiple heads 14 is shown. The disk drive 10A is used to implement and show a RAIP Level 1 embodiment in which RAIP Level 1 is generally RAID Level 1 concepts and techniques incorporated into and within the single disk drive 10A. The platter 12 is divided into various stripes 16 (i.e. Stripe 1, Stripe 2, ..., Stripe n). FIG. 1 shows that the data is mirrored within the platter 12 so that two sets of stripes (i.e. two sets of Stripe 1, Stripe 2, ..., Stripe n) are shown. Mirroring in this instance divides the platter 12 into two sets of stripes 16 as shown in FIG. 3.

RAIP 1 involves all data written to the single drive 10A with single platter 12 as being written identically into two sets of stripes 16. Thus, a pair of stripe sets with identical data is created. In the event of failure of or error in one of the stripe sets, the same data is still accessible and usable from the other stripe set while the failed stripe set is reconfigured or repaired provided the other stripe set was not affected by the failure or error.

Figure 4:
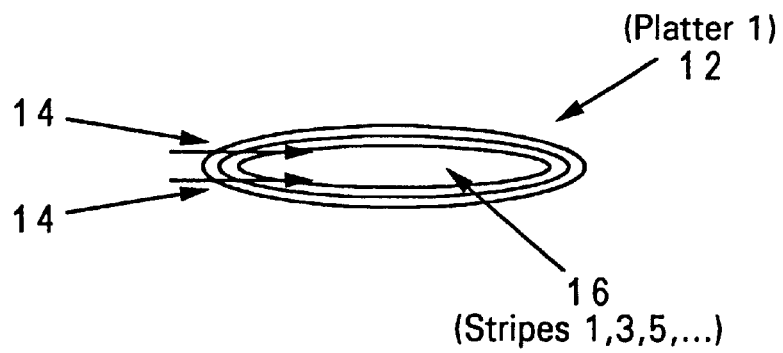
FIG. 4 is a front perspective view of a first platter of a single disk drive having multiple platters and multiple heads wherein the first platter is used to implement and show RAIP Level 3.
Figure 5:
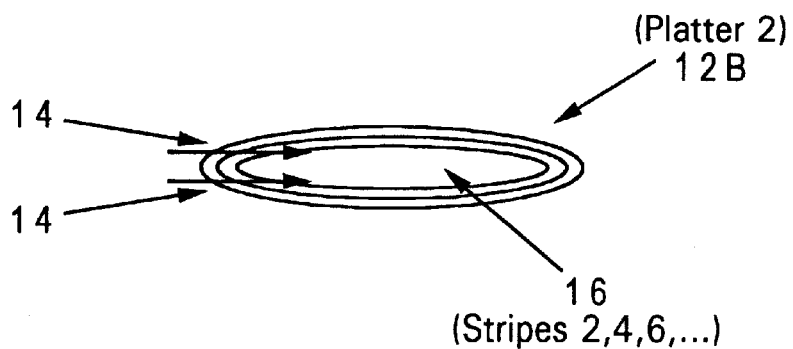
FIG. 5 is a front perspective view of a second platter of a single disk drive having multiple platters and multiple heads wherein the second platter is used to implement and show RAIP Level 3.
Figure 6:
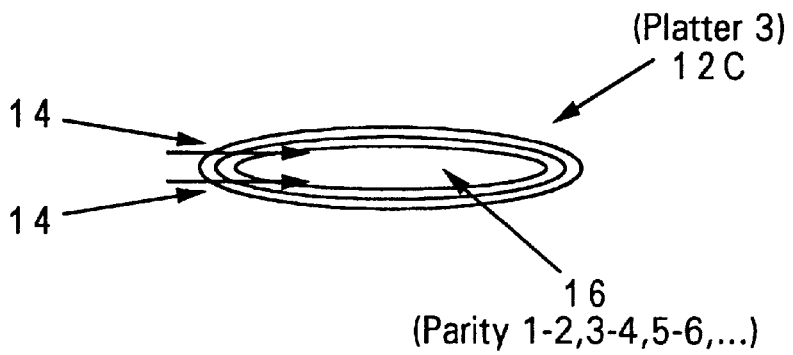
FIG. 6 is a front perspective view of a third platter of a single disk drive having multiple platters and multiple heads wherein the third platter is used to implement and show RAIP Level 3.

With reference now to the figures and in particular with reference to FIGS. 4, 5, and 6, platters 12A, 12B, and 12C for a single disk drive 10B with multiple heads 14 are shown. With reference now to the figures and in particular with reference to FIG. 7, the single disk drive 10B with the multiple platters 12A, 12B, and 12C and multiple heads 14 is shown. The disk drive 10B is used to implement and show a RAIP Level 3 embodiment in which RAIP Level 3 is generally RAID Level 3 concepts and techniques incorporated into and within the single disk drive 10B.

Figure 7:
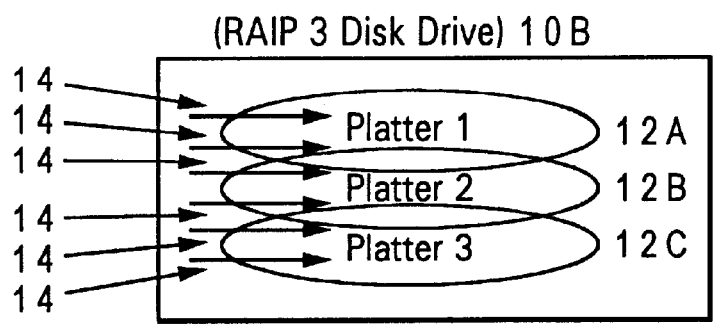
FIG. 7 is a front perspective view of a single disk drive with multiple platters and multiple heads that is used to implement and show a RAIP Level 3 embodiment, which is RAID Level 3 concepts and techniques incorporated into and within a single disk drive.

FIG. 4 shows that platter 12A (Platter 1) is divided into various stripes 16 (i.e. Stripe 1, Stripe 3, and Stripe 5), and a head 14 is located at and reading each stripe 16. FIG. 5 shows that platter 12B (Platter 2) is divided into various stripes 16 (i.e. Stripe 2, Stripe 4, and Stripe 6), and a head 14 is located at and reading each stripe 16. FIG. 6 shows that platter 12C (Platter 3) is divided into various parity stripes 16 (i.e. Parity Stripe 1–2, Parity Stripe 3–4, and Parity Stripe 5–6), and a head 14 is located at and reading each parity stripe 16. FIG. 7 shows the single disk drive 10B with the multiple platters 12A, 12B, and 12C (i.e. Platters 1, 2, and 3) with the respective heads 14.

RAIP 3 stripes data one group of bits or bytes at a time across all the multiple platters 12A, 12B, and 12C (i.e. Platters 1, 2, and 3) within the single disk drive 10B. Parity information is used to reconstruct missing data and is stored on the separate dedicated platter (i.e. platter 12C). A RAIP 3 configuration requires at least one parity platter (i.e. platter 12C) and at least two other platters (i.e. data platters 12A and 12B). RAIP 3 also requires all of the platters to be rotationally synchronized.

RAIP 3 provides the following advantages: 1) Reduction of amount of additional platter space required for redundancy since dedicated parity platter is used; 2) Performance is enhanced in very large block transfers; 3) Data protection is excellent since, in the event of a platter failure, data is still able to be accessed and reconstructed by using the information from the other platters and the parity platter. Performance may suffer during write operations (i.e. bottleneck) since only a single parity platter (i.e. platter 12C) is provided.

With reference now to the figures and in particular with reference to FIGS. 8, 9, 10, and 11, platters 12D, 12E, 12F, and 12G for a single disk drive 10C with multiple heads 14 is shown. With reference now to the figures and in particular with reference to FIG. 12, the single disk drive 10C with the multiple platters 12D, 12E, 12F, and 12G and multiple heads 14 is shown. The disk drive 10C is used to implement and show a RAIP Level 5 embodiment in which RAIP Level 5 is generally RAID Level 5 concepts and techniques incorporated into and within the single disk drive 10C.

Figure 8:
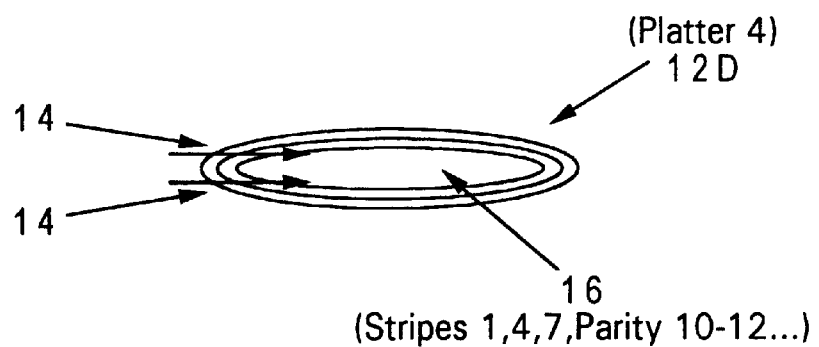
FIG. 8 is a front perspective view of a first platter of a single disk drive having multiple platters and multiple heads wherein the first platter is used to implement and show RAIP Level 5.
Figure 9:
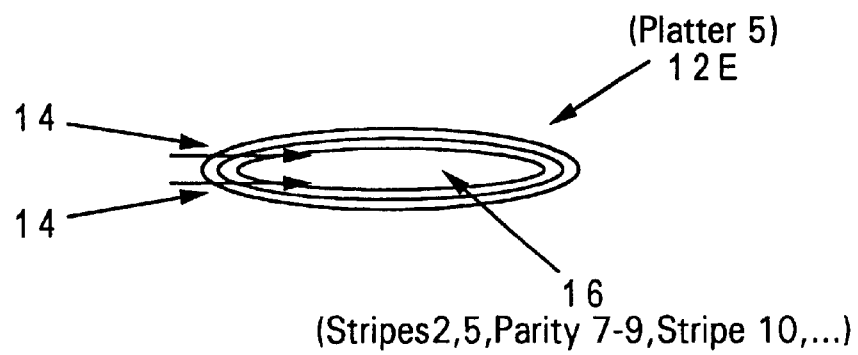
FIG. 9 is a front perspective view of a second platter of a single disk drive having multiple platters and multiple heads wherein the second platter is used to implement and show RAIP Level 5.
Figure 10:
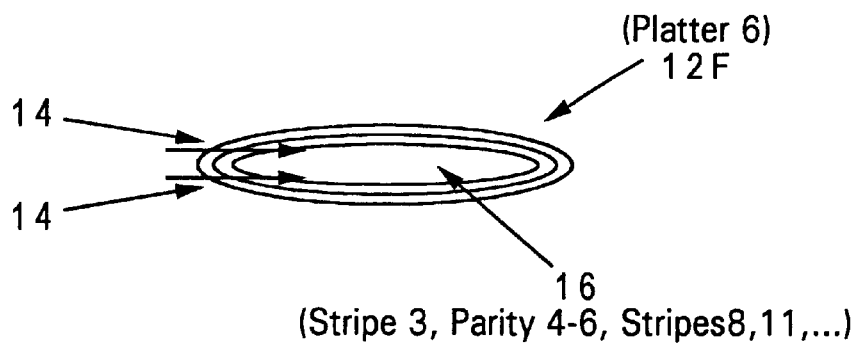
FIG. 10 is a front perspective view of a third platter of a single disk drive having multiple platters and multiple heads wherein the third platter is used to implement and show RAIP Level 5.
Figure 11:
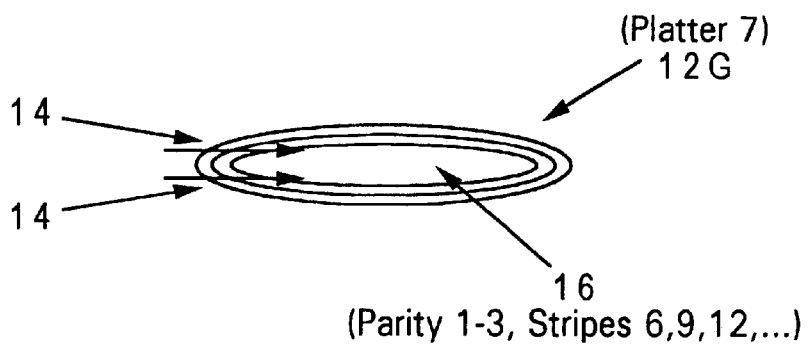
FIG. 11 is a front perspective view of a fourth platter of a single disk drive having multiple platters and multiple heads wherein the fourth platter is used to implement and show RAIP Level 5.
Figure 12:
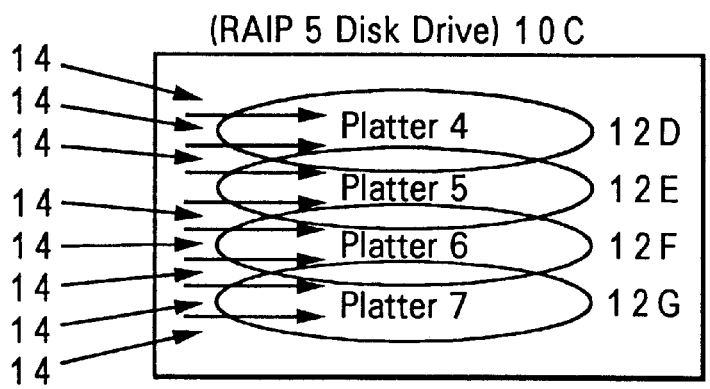
FIG. 12 is a front perspective view of a single disk drive with multiple platters and multiple heads that. is used to implement and show a RAIP Level 5 embodiment, which is RAID Level 5 concepts and techniques incorporated into and within a single disk drive.

FIG. 8 shows that platter 12D (Platter 4) is divided into various stripes 16 (i.e. Stripe 1, Stripe 4, Stripe 7, and Parity Stripe 10–12), and a head 14 is located at and reading each stripe 16. FIG. 9 shows that platter 12E (Platter 5) is divided into various stripes 16 (i.e. Stripe 2, Stripe 5, Parity Stripe 7–9, and Stripe 10), and a head 14 is located at and reading each stripe 16. FIG. 10 shows that platter 12F (Platter 6) is divided into various parity stripes 16 (i.e. Stripe 3, Parity Stripe 4–6, Stripe 8, and Stripe 11), and a head 14 is located at and reading each parity stripe 16. FIG. 11 shows that platter 12G (Platter 7) is divided into various stripes 16 (i.e. Parity Stripe 1–3, Stripe 6, Stripe 9, and Stripe 12), and a head 14 is located at and reading each parity stripe 16. FIG. 12 shows the single disk drive 10C with the multiple platters 12D, 12E, 12F, and 12G (i.e. Platters 4, 5, 6, and 7) with the respective heads 14.

RAIP 5 utilizes the concepts of data striping and block interleaving. The technique provides faulttolerant data storage and does not require duplicate stripe sets such as in RAIP 1. RAIP 5 spreads the data and parity information across the platters (such as platters 12D, 12E, 12F, and 12G) one block at a time. This spreading of information provides maximum read performance when accessing large files and improves array performance in a transaction processing environment. Redundancy is provided by parity information being striped across the platters (i.e. platters 12D, 12E, 12F, and 12G). The striping of information removes the bottleneck that results from storing all of the parity data onto a single platter.

RAIP 5 requires a minimum of three platters. The parity data is stored in a storage capacity equivalent to one platter per entire array. Performance in RAIP 5 is generally superior than in RAIP 3. However, performance boost is somewhat limited to smaller block transfers, such as the size of typical network or Internet files. RAIP 5 provides excellent protection in that if any of the platters fails, the data is still able to be accessed by using the information from the other platters and the striped parity information.

RAIP 5 provides the following advantages: 1) Redundancy is provided by using dedicated parity in at least one stripe per platter; 2) The least or minimal amount of storage capacity overhead is used in the number of platters; and 3) The minimal amount of additional platters necessary to implement redundancy is used. RAIP 5, however, also provides the following disadvantages: 1) The write performance is not as good as in RAIP 1; 2) The read performance is not as good as in RAIP 1; and 3) The critical-performance may not be as good as the other RAIP levels.

While the invention has been particularly shown and described with reference to a preferred embodiment, it will be understood by those skilled in the art that various changes in form and detail may be made therein without departing from the spirit and scope of the invention.

What is claimed is:

1. A system for implementing a redundant array of inexpensive platters within a single disk drive, said system comprising:

a plurality of platters within the single disk drive;

a number of data stripes located on the plurality of platters;

a data integrity unit on one of said plurality of platters; and a number of heads communicatively coupled to the plurality of platters, wherein the stripes on the plurality of platters are used to store data such that said data integrity unit provides a means for recovering a compromised data from said number of stripes.

2. The system according to claim 1, wherein:

the number of platters is at least three platters wherein at least one of the at least three platters is a dedicated parity platter and at least two of the at least three platters are data platters;

the data is striped across at least two data platters; and parity information stored on the dedicated parity platter is used to reconstruct any missing data.

3. The system according to claim 2, wherein the at least one dedicated parity platter is a single dedicated parity platter.

4. The system according to claim 1, wherein said data integrity unit includes a parity bit.

5. The system according to claim 1, wherein invar is used as a supporting material of the heads for preventing movements of the heads relative to each other caused from thermal expansion.

6. The system according to claim 1, further comprising:

micro-adjusters coupled to the heads wherein the micro-adjusters are used for adjusting and controlling positions of the heads relative to the at least one platter of the single disk drive.

7. The system according to claim 1, further comprising:

thermal conduction paths designed into the at least one platter to help minimize thermal expansion therein.

8. A system for implementing a single platter within a single disk drive for storing data, said system comprising:

a number of stripes located in a single platter for dividing storage within the single platter, a data integrity unit on said single platter, and multiple heads communicatively coupled to the single platter, wherein the stripes in the single platter are used to provide or store the data such that said data integrity unit provides a means for recovering a compromised data from said number of stripes.

9. The system according to claim 8, wherein:

the data integrity unit is a mirror image of the stored data, said mirror image being mirrored in the single platter by storing the data into two sets of stripes as two identical sets of data wherein if a failure occurs within a storage sector containing one of the two identical sets of data, then the other of the two identical sets of data is still able to be accessed and used.

10. The system according to claim 8, wherein the data integrity unit is an error correction code.

11. The system according to claim 10, wherein said error correction code includes a parity bit.

12. A method for implementing and using a redundant array of inexpensive platters within a single disk drive, said method comprising the steps of:

providing a plurality of platters within the single disk drive;

locating a number of data stripes and a data integrity unit in the plurality of platters for dividing storage within the plurality of platters;

communicatively coupling a number of heads to the plurality of platters; and using the stripes and the data integrity unit in the plurality of platters in a manner for providing and storing the data in a level of the redundant array of inexpensive platters, such that said data integrity unit provides for a recovery a compromised data from said number of data stripes.

13. The method according to claim 12, further comprising the step of:

using at least one the platters as a dedicated parity platter.

14. The method according to claim 12, further comprising the step of:

using invar as a supporting material for the heads in order to prevent movements of the heads relative to each other caused from thermal expansion.

15. The method according to claim 12, further comprising the steps of:

coupling micro-adjusters to the heads, and using the micro-adjusters for adjusting and controlling positions of the heads relative to the multiple platters of the single disk drive.

16. The method according to claim 12, further comprising the step of:

designing thermal conduction paths into the multiple platters to help minimize thermal expansion therein.

17. A method of implementing a single platter within a single disk drive for storing data, said method comprising the steps of:

providing a number of stripes on a single platter within the single disk drive for dividing storage within the single platter, providing a number of heads communicatively coupled to the single platter for reading data thereat, storing the data and a data integrity unit on the single platter, and using the number of stripes and the data integrity unit in the single platter to provide and store the data wherein the stripes and data integrity unit are able to recover a compromised data from the number of stripes.

18. The method according to claim 17, further comprising the steps of:

dividing the stripes into two sets of stripes within the single platter, and mirroring the data in the single platter by storing the data into the two sets of stripes as two identical sets of data wherein if a failure occurs within one of the two identical sets of data, then the other of the two identical sets of data is still able to be accessed and used.

* * * * *